United States Patent
Qu et al.

(10) Patent No.: US 11,175,422 B2
(45) Date of Patent: Nov. 16, 2021

(54) METHOD AND APPARATUS FOR IDENTIFYING LOW PERMEABLE CONGLOMERATE DIAGENETIC TRAP

(71) Applicant: PetroChina Company Limited, Beijing (CN)

(72) Inventors: Yongqiang Qu, Beijing (CN); Jianguo Pan, Beijing (CN); Lu Yin, Beijing (CN); Guodong Wang, Beijing (CN); Duonian Xu, Beijing (CN); Tuanyu Teng, Beijing (CN); Bin Wang, Beijing (CN); Jianhua Qu, Beijing (CN); Dezi Li, Beijing (CN); Linjun Huang, Beijing (CN); Yongping Ma, Beijing (CN); Xuezhen Chen, Beijing (CN)

(73) Assignee: PetroChina Company Limited, Beijing (CN)

( * ) Notice: Subject to any disclaimer, the term of this patent is extended or adjusted under 35 U.S.C. 154(b) by 684 days.

(21) Appl. No.: 16/023,226

(22) Filed: Jun. 29, 2018

(65) Prior Publication Data
US 2019/0011584 A1    Jan. 10, 2019

(30) Foreign Application Priority Data
Jul. 5, 2017    (CN) .......................... 201710542341.5

(51) Int. Cl.
G01V 1/30     (2006.01)
E21B 49/00    (2006.01)
G01V 1/28     (2006.01)

(52) U.S. Cl.
CPC .............. *G01V 1/306* (2013.01); *E21B 49/00* (2013.01); *G01V 1/282* (2013.01);
(Continued)

(58) Field of Classification Search
CPC ........... G01V 1/306; G01V 2210/6244; G01V 2210/6246; G01V 2210/6169;
(Continued)

(56) References Cited

U.S. PATENT DOCUMENTS 6,498,989 B1 * 12/2002 Pisetski .................. G01V 1/288
                                                                        702/14
2011/0307178 A1 * 12/2011 Hoekstra .................. G01V 1/28
                                                                        702/5
(Continued)

FOREIGN PATENT DOCUMENTS

CN    101149439    3/2008
CN    104360412    2/2015
(Continued)

OTHER PUBLICATIONS

Cao, L. et al. "Palaeo-trap types of Xujiahe Formation in the western Sichuan Depression and identification technology", Actapetrolei Sinica, vol. 27, No. 4, pp. 45-49 (English abstract).
(Continued)

*Primary Examiner* — Manuel A Rivera Vargas
*Assistant Examiner* — Yaritza H Perez Bermudez
(74) *Attorney, Agent, or Firm* — Meunier Carlin & Curfman LLC

(57) ABSTRACT

Identifying a low permeable conglomerate diagenetic trap can be implemented according to a method that comprises: determining a first relation curve between a depth and a critical physical property of a known diagenetic trap in a target work area, and a second relation curve between a reservoir physical property of the known diagenetic trap and a designated seismic attribute; determining a third relation curve between the depth and the critical physical property in the target work area and the designated seismic attribute according to the first relation curve and the second relation
(Continued)

curve; and performing a diagenetic trap identification of the target work area according to the third relation curve. Identification accuracy of a low permeable conglomerate diagenetic trap can thereby be improved.

13 Claims, 6 Drawing Sheets

(52) U.S. Cl.
CPC .............. *G01V 2210/6169* (2013.01); *G01V 2210/6244* (2013.01); *G01V 2210/6246* (2013.01)

(58) Field of Classification Search
CPC .................. G01V 1/282; G01V 1/307; G01V 2210/6226; E21B 49/00
See application file for complete search history.

(56) References Cited

U.S. PATENT DOCUMENTS

| 2013/0064040 | A1* | 3/2013 | Imhof | G01V 1/30 367/73 |
| 2016/0377752 | A1 | 12/2016 | Cavelius et al. | |
| 2020/0379136 | A1* | 12/2020 | Ji | G01V 1/364 |

FOREIGN PATENT DOCUMENTS

| CN | 104459783 | 3/2015 |
| CN | 104948176 | 9/2015 |
| CN | 104965979 | 10/2015 |
| CN | 105005080 | 10/2015 |
| CN | 105372709 | 3/2016 |
| CN | 106338764 | 1/2017 |
| WO | 2016110298 | 7/2016 |

OTHER PUBLICATIONS

Xu, D. et al. "Prediction Method of the Low Premeability Sandy-conglomerate "Sweet Point" Reservoirs and its Application: A Case Study of Mahu Depression Northern Slope Area in the Junggar Basin", Natural Gas Geoscience, vol. 26. pp. 154-161 (English abstract).

English translation of Chinese Search Report from application No. 2017105423415, 5 pages.

First Office Action dated Sep. 20, 2018 from application No. 2017105423415, 6 pages.

Hailong, J. "Identification of subtle traps in Hassan block, Junggar Basin", Oil&Gas Geology,vol. 33, No. 5, Oct. 2012, English Abstract.

\* cited by examiner

METHOD AND APPARATUS FOR IDENTIFYING LOW PERMEABLE CONGLOMERATE DIAGENETIC TRAP

CROSS-REFERENCE TO RELATED APPLICATIONS

This application claims priority to Chinese Patent Application No. 2017105423415, filed on Jul. 5, 2017, which is hereby incorporated by reference in its entirety.

TECHNICAL FIELD

The present application relates to the technical field of trap identification in oil and gas exploration, and particularly, to a method and apparatus for identifying a low permeable conglomerate diagenetic trap.

BACKGROUND

In the field of oil and gas exploration, a trap is a site suitable for accumulation of oil and gas and formation of an oil-gas reservoir. Thus, trap identification can be an effective way to look for the oil-gas reservoir. Since Rittenhouse proposed the concept of a diagenetic trap in 1972, the diagenetic trap has become considered one important type of trap. The diagenetic trap is mainly formed by a complete or partial occlusion by a non-reservoir due to physical property changes caused by the deposition and diagenesis during or after the depositional stage. Generally, the surrounding rock and the reservoir of the diagenetic trap have the same lithology.

In current and/or conventional oil and gas exploration, only a small number of low permeable conglomerate diagenetic traps are generally found, and the formation mechanism and the diagenetic characteristics thereof are seldom studied. Among other needs, there exists is a need to accurately identify a low permeable conglomerate diagenetic trap.

SUMMARY

In some aspects, the present application provides a method and apparatus for identifying a low permeable conglomerate diagenetic trap, so as to improve the identification accuracy of the low permeable conglomerate diagenetic trap.

In one aspect, the present application relates to a method for identifying a low permeable conglomerate diagenetic trap. In one embodiment, the method comprises: determining a first relation curve between a depth and a critical physical property of a known diagenetic trap in a target work area, and a second relation curve between a reservoir physical property of the known diagenetic trap and a designated seismic attribute; determining a third relation curve between the depth and the critical physical property in the target work area and the designated seismic attribute according to the first relation curve and the second relation curve; and performing a diagenetic trap identification of the target work area according to the third relation curve.

In one embodiment, determining a first relation curve between a depth and a critical physical property of a known diagenetic trap in a target work area comprises: acquiring a depth, a surrounding rock pore throat radius, a reservoir pore throat radius and a reservoir porosity corresponding to the reservoir pore throat radius of the known diagenetic trap; determining a relation curve between the depth and a critical reservoir pore throat radius in the target work area according to the depth and a ratio of the reservoir pore throat radius to the surrounding rock pore throat radius; and determining a relation curve between the depth and the critical porosity in the target work area according to the reservoir porosity and the relation curve between the depth and the critical reservoir pore throat radius.

In one embodiment, when the designated seismic attribute is a relative wave impedance, determining a second relation curve between a reservoir physical property of the known diagenetic trap and a designated seismic attribute comprises: acquiring a reservoir porosity of the known diagenetic trap and corresponding relative wave impedance; and fitting the reservoir porosity with the corresponding relative wave impedance to obtain a relation curve between the reservoir porosity and the corresponding relative wave impedance in the target work area.

In one embodiment, the third relation curve comprises a relation curve between a critical porosity, the depth and a relative wave impedance in the target work area.

In one embodiment, determining a relation curve between the depth and a critical reservoir pore throat radius in the target work area according to the depth and a ratio of the reservoir pore throat radius to the surrounding rock pore throat radius comprises: cross-plotting the depth with the ratio of the reservoir pore throat radius to the surrounding rock pore throat radius, and determining the relation curve between the depth and the critical reservoir pore throat radius in the target work area.

In one embodiment, determining a relation curve between the depth and the critical porosity in the target work area according to the reservoir porosity and the relation curve between the depth and the critical reservoir pore throat radius comprises: determining the relation curve between the depth and the critical porosity in the target work area according to a positive correlation relation between the reservoir porosity and the reservoir pore throat radius, and the relation curve between the depth and the critical reservoir pore throat radius.

In one embodiment, identifying a low permeable conglomerate diagenetic trap in the embodiments of the present application, performing a diagenetic trap identification of the target work area according to the third relation curve comprises: in each depth plane of the target work area, determining a distribution of position points where a first porosity is larger than a second porosity according to the third relation curve, so as to determine a distribution of diagenetic traps in the depth plane, wherein the first porosity is a reservoir porosity corresponding to the relative wave impedance under the depth, and the second porosity is a critical porosity under the depth; and obtaining a diagenetic trap identification result of the target work area according to the distribution of the diagenetic traps in all of the depth planes of the target work area.

In another aspect, the present application relates to an apparatus for identifying a low permeable conglomerate diagenetic trap. In one embodiment, the apparatus comprises: a first determination module configured to determine a first relation curve between a depth and a critical physical property of a known diagenetic trap in a target work area, and a second relation curve between a reservoir physical property of the known diagenetic trap and a designated seismic attribute; a second determination module configured to determine a third relation curve between the depth and the critical physical property in the target work area and the designated seismic attribute according to the first relation curve and the second relation curve; and a trap identification module configured to perform a diagenetic trap identification of the target work area according to the third relation curve.

In one embodiment, when determining a first relation curve between a depth and a critical physical property of a known diagenetic trap in a target work area, the first determination module is further configured to: acquire a depth, a surrounding rock pore throat radius, a reservoir pore throat radius and a reservoir porosity corresponding to the reservoir pore throat radius of the known diagenetic trap; determine a relation curve between the depth and a critical reservoir pore throat radius in the target work area according to the depth and a ratio of the reservoir pore throat radius to the surrounding rock pore throat radius; and determine a relation curve between the depth and the critical porosity in the target work area according to the reservoir porosity and the relation curve between the depth and the critical reservoir pore throat radius.

In one embodiment, when the designated seismic attribute is a relative wave impedance in case of determining a second relation curve between a reservoir physical property of the known diagenetic trap and a designated seismic attribute, the first determination module is further configured to: acquire a reservoir porosity of the known diagenetic trap and corresponding relative wave impedance; and fit the reservoir porosity with the corresponding relative wave impedance to obtain a relation curve between the reservoir porosity and the corresponding relative wave impedance in the target work area.

In one embodiment, the third relation curve comprises a relation curve between a critical porosity, the depth and a relative wave impedance in the target work area.

In one embodiment, when determining a relation curve between the depth and a critical reservoir pore throat radius in the target work area according to the depth and a ratio of the reservoir pore throat radius to the surrounding rock pore throat radius, the first determination module is further configured to: cross-plot the depth with the ratio of the reservoir pore throat radius to the surrounding rock pore throat radius, and determine the relation curve between the depth and the critical reservoir pore throat radius in the target work area.

In one embodiment, when determining a relation curve between the depth and the critical porosity in the target work area according to the reservoir porosity and the relation curve between the depth and the critical reservoir pore throat radius, the first determination module is further configured to: determine the relation curve between the depth and the critical porosity in the target work area according to a positive correlation relation between the reservoir porosity and the reservoir pore throat radius, and the relation curve between the depth and the critical reservoir pore throat radius.

In one embodiment, when performing a diagenetic trap identification of the target work area according to the third relation curve, the trap identification module is configured to: in each depth plane of the target work area, determine a distribution of position points where a first porosity is larger than a second porosity according to the third relation curve, so as to determine a distribution of diagenetic traps in the depth plane, wherein the first porosity is a reservoir porosity corresponding to the relative wave impedance under the depth, and the second porosity is a critical porosity under the depth; and obtain a diagenetic trap identification result of the target work area according to the distribution of the diagenetic traps in all of the depth planes of the target work area.

In still another aspect, the present application relates to a computer storage medium in which a computer program is stored, wherein when being executed by a processor, the computer program implements the steps of: determining a first relation curve between a depth and a critical physical property of a known diagenetic trap in a target work area, and a second relation curve between a reservoir physical property of the known diagenetic trap and a designated seismic attribute; determining a third relation curve between the depth and the critical physical property in the target work area and the designated seismic attribute according to the first relation curve and the second relation curve; and performing a diagenetic trap identification of the target work area according to the third relation curve.

As can be seen from some of the above described technical solutions, some embodiments of the present application can establish the relation between the critical physical property and the depth in the target work area and the designated seismic attribute, based on the determined relation between the depth and the critical physical property of the known diagenetic trap in the target work area, and the determined relation between the reservoir physical property of the known diagenetic trap and the designated seismic attribute, and perform the diagenetic trap identification of the target work area based on the established relation. In accordance with some aspects, the changes of the critical physical property are considered under different depths. By implementing certain aspects and embodiments of the present application, a diagenetic trap identification result can be obtained with a higher accuracy.

BRIEF DESCRIPTION OF THE DRAWINGS

In order to describe some technical solutions and embodiments of the present application, accompanying drawings are provided, which are briefly described below.

DETAILED DESCRIPTION OF EMBODIMENTS

Certain aspects and embodiments of the present application and some technical solutions provided by implementation of one or more of the aspects and embodiments will be described as follows with reference to the drawings.

An important factor for evaluating whether a low permeable conglomerate diagenetic trap is accurate and effective lies in whether oil and gas can be filled into the reservoir, i.e., at which value of the physical property of the reservoir in the diagenetic trap can oil and gas enter the reservoir, thus the determination of the critical physical property is a difficult point in the low permeable conglomerate diagenetic trap identification. Conventionally, the critical physical properties under different depths are usually deemed as a constant value in this field. However, the present inventors have found that in aspects of oil-gas charging dynamics, various charging powers have different reservoir formation requirements. Thus, the critical physical property should be varied under different depths. If the same critical physical property value is taken under different depths to perform the low permeable conglomerate diagenetic trap identification, the identification accuracy of the low permeable conglomerate diagenetic trap will be easily low. Thus, in order to depict the low permeable conglomerate diagenetic trap meticulously, and to improve the identification accuracy of the low permeable conglomerate diagenetic trap, certain embodiments of the present application provide technical solutions for identifying a low permeable conglomerate diagenetic trap, as will be described in further detail as follows.

Figure 1:
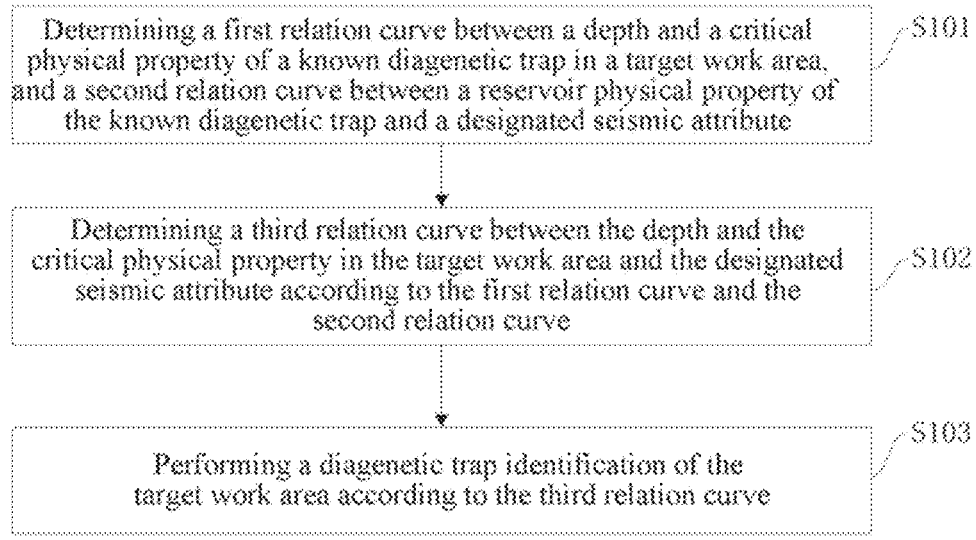
FIG. 1 illustrates a flow diagram of a method for identifying a low permeable conglomerate diagenetic trap according to one embodiment of the present application.

Now referring to FIG. 1, according to one aspect of the present application, a method for identifying a low permeable conglomerate diagenetic trap is provided. In one embodiment, the method comprises S101: determining a first relation curve between a depth and a critical physical property of a known diagenetic trap in a target work area, and a second relation curve between a reservoir physical property of the known diagenetic trap and a designated seismic attribute.

An oil-gas charging resistance to a reservoir of the low permeable conglomerate is:

$$f \approx \Delta Pc + f(H) \quad (1)$$

wherein f denotes an oil-gas charging resistance, $\Delta Pc$ denotes a capillary pressure difference, H denotes a depth or a burial depth, and f (H) denotes a stratum pressure, and $$\Delta Pc = Pr - PR = 2\sigma\cos\theta\left(\frac{1}{r} - \frac{1}{R}\right) \quad (2)$$

wherein Pr denotes a surrounding rock capillary pressure, PR denotes a reservoir capillary pressure, $\sigma$ denotes an interfacial tension with an unit of $N/m^2$, $\theta$ denotes an angle between the interfacial tension and an horizontal direction with an unit of °, r denotes a surrounding rock pore throat radius with an unit of $\mu m$, and R denotes a reservoir pore throat radius with an unit of $\mu m$.

The capillary pressure difference denotes a difference between the structure characteristics of the surrounding rock and the reservoir pore. Rather than the representation by $$2\sigma\cos\theta\left(\frac{1}{r} - \frac{1}{R}\right), Pr/PR = 2\sigma\cos\theta\frac{1}{r} \bigg/ 2\sigma\cos\theta\frac{1}{R} = R/r$$

may be considered for the representation. Thus, the oil-gas charging resistance is related to R, r, and H.

R/r can control the validity of the diagenetic trap. Specifically, the oil test result of the known diagenetic trap of each well in the target work area can be counted under the same depth (or approximately the same depth), and the reservoir pore throat radius R and the surrounding rock pore throat radius r of corresponding known diagenetic trap can be acquired from experiments or existing data. The surrounding rock pore throat radiuses under the same depth (or approximately the same depth) can take the same value, and an average value may be taken if there is a lot of surrounding rock data points. It is counted whether a ratio (i.e., R/r) of the reservoir pore throat radius to the surrounding rock pore throat radius reaches a certain value. When the ratio is smaller than the value, the oil test result is a dry layer or a water layer, and when the ratio is larger than the value, the oil test result is an oil-water inclusion layer, an oil-water layer or an oil layer, thereby showing that the validity of the diagenetic trap is controlled by the structure characteristics of the reservoir and the surrounding rock hole, i.e., it can be quantitatively represented.

Figure 2:
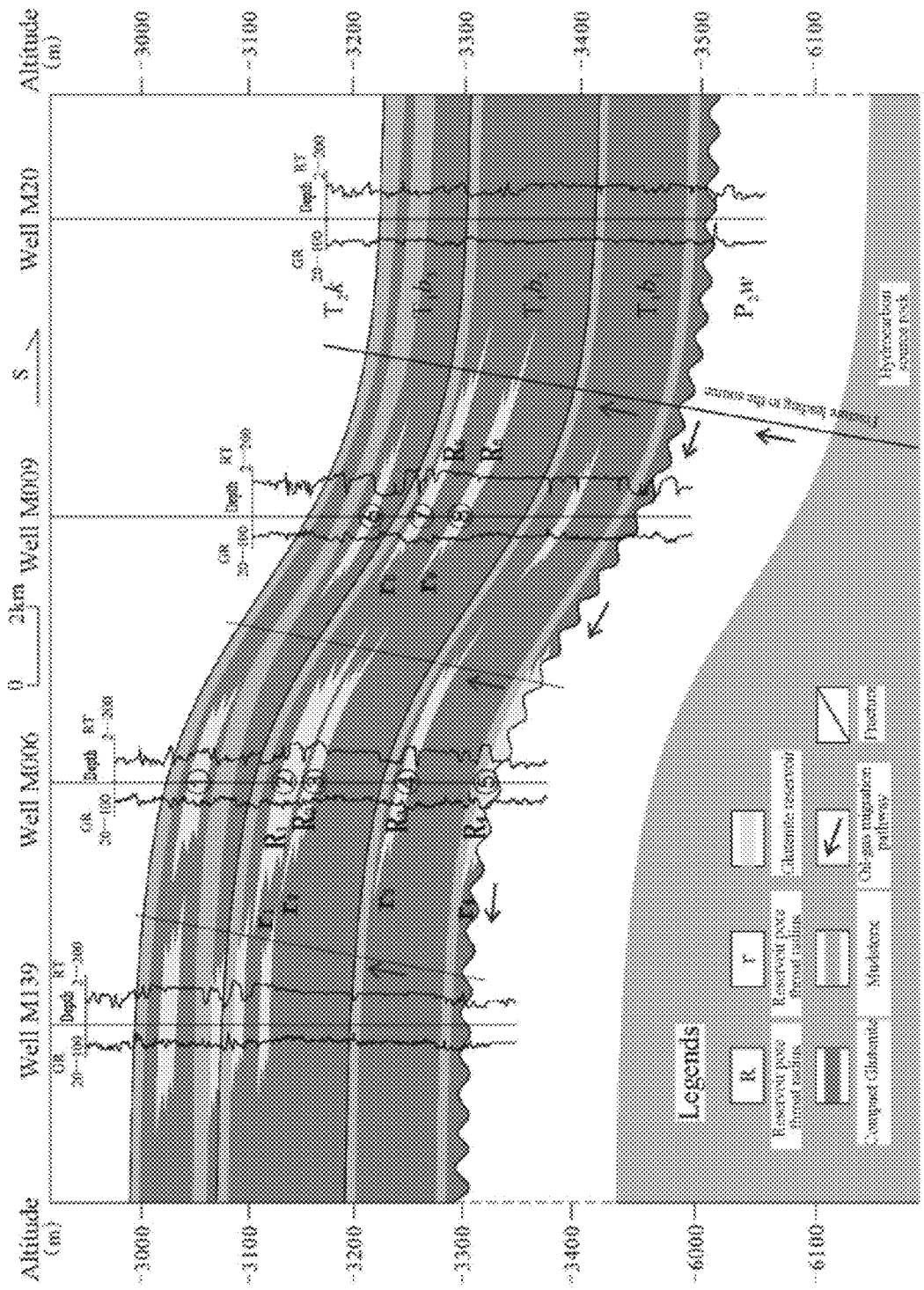
FIG. 2 illustrates a conglomerate diagenetic trap formation geologic model according to one embodiment of the present application.

Now referring to the illustration of FIG. 2, eight diagenetic traps are marked in a conglomerate diagenetic trap formation geologic model, wherein R/r<8 in ① and ⑥, and the oil test result is a dry layer or a water layer, R/r>8 in ② to ⑤, ⑦ and ⑧, and the oil test result is an oil-water layer or an oil layer. The oil saturation increases as R/r rises, which indicates that R/r can control the validity of the diagenetic trap. In FIG. 2, GR denotes a natural gamma logging curve of a stratum, and RT denotes a true resistivity logging curve of the stratum.

In one embodiment of the present application, the known diagenetic trap is screened from all of the known diagenetic traps in the target work area, and R/r of the screened known diagenetic trap has a certain value. When R/r is smaller than the value, the oil test result is a dry layer or a water layer, and when R/r is larger than the value, the oil test result is an oil-water inclusion layer, an oil-water layer or an oil layer, thus ensuring the validity of the diagenetic trap identification.

Figure 3:
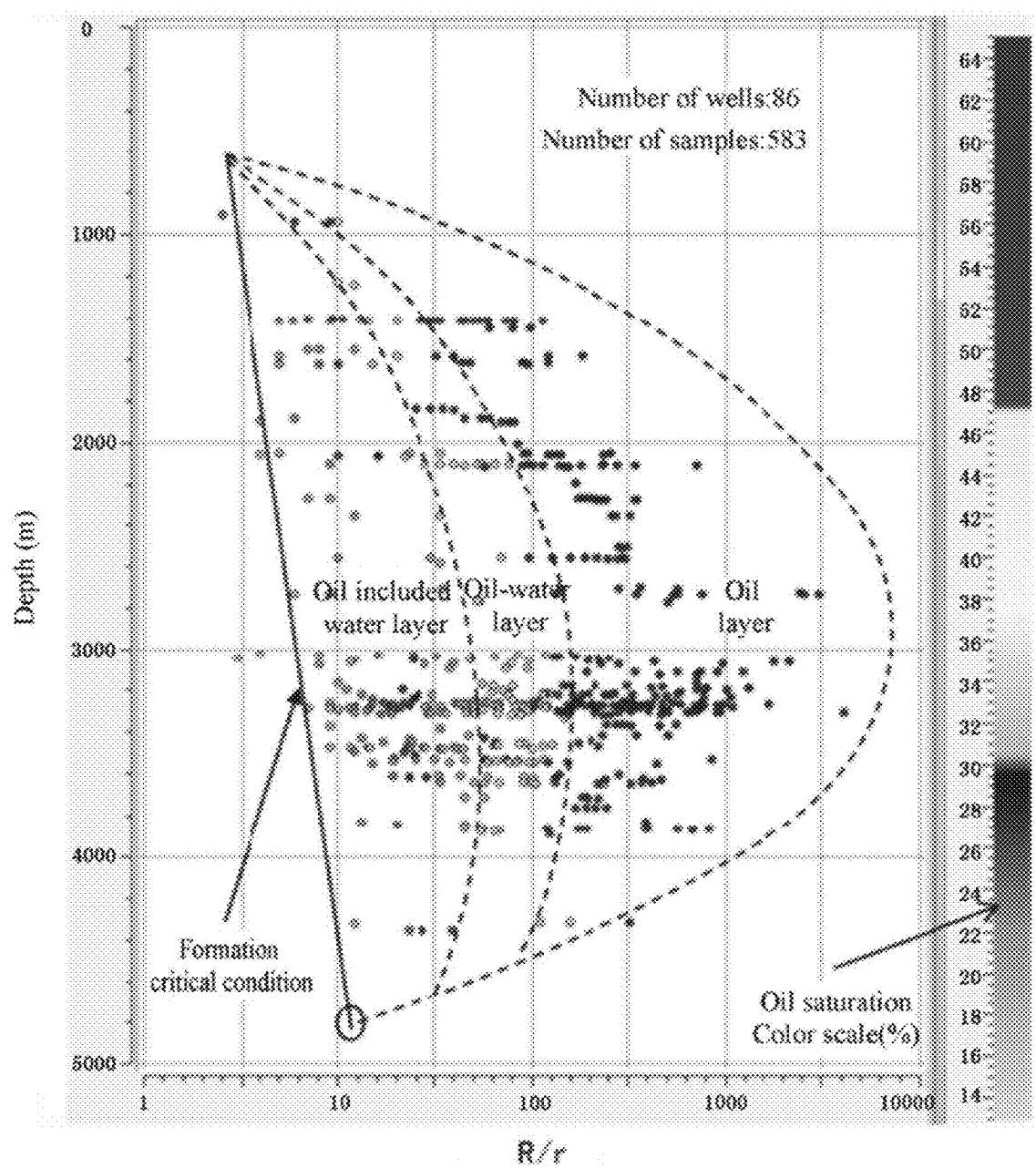
FIG. 3 illustrates a cross-plot between a depth and a ratio (R/r) of a reservoir pore throat radius to a surrounding rock pore throat radius according to one embodiment of the present application.
Figure 4:
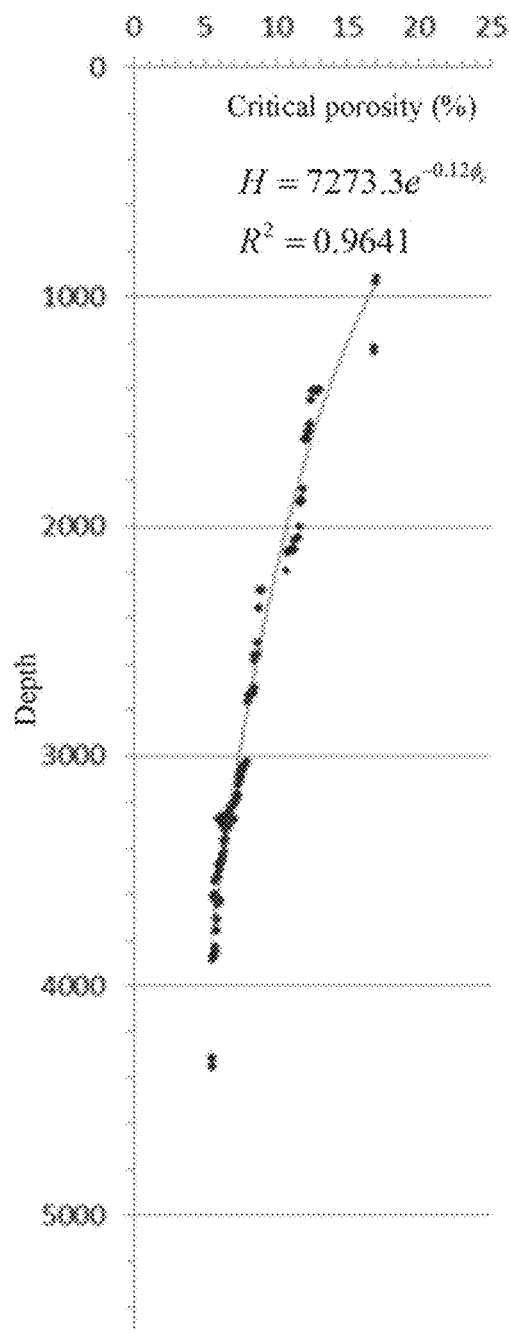
FIG. 4 illustrates a cross-plot between a depth and a critical porosity according to one embodiment of the present application.

In one embodiment of the present application, determining a first relation curve between a depth and a critical physical property of a known diagenetic trap in a target work area specifically can include the following. First, a depth, a surrounding rock pore throat radius, a reservoir pore throat radius and a reservoir porosity corresponding to the reservoir pore throat radius may be acquired from experiments or existed data. Second, a relation curve between the depth and a critical reservoir pore throat radius in the target work area may be determined according to the depth and the ratio of the reservoir pore throat radius to the surrounding rock pore throat radius. Specifically, for example a cross-plot may be made between the depth and the ratio of the reservoir pore throat radius to the surrounding rock pore throat radius, so as to determine the relation curve between the depth and the critical reservoir pore throat radius in the target work area, as illustrated in FIG. 3. In FIG. 3, the horizontal axis is R/r, the vertical coordinate is the depth, and the curve pointed to by the formation critical is the relation curve between the depth and the critical reservoir pore throat radius. As can be seen from FIG. 3, most of the known diagenetic traps in the target work area are located above the relation curve, and the critical reservoir pore throat radius varies with the depth. Next, the relation curve between the depth and the critical porosity in the target work area may be determined according to the reservoir porosity and the relation curve between the depth and the critical reservoir pore throat radius. Under most conditions, the reservoir pore throat radius is positively correlated to the reservoir porosity, thus the relation curve between the depth and the critical porosity in the target work area can be determined according to the positive correlation relation between the reservoir porosity and the reservoir pore throat radius, i.e., a critical porosity corresponding to each critical reservoir pore throat radius is determined, and then cross-plotted with the depth to obtain the relation curve between the depth and the critical porosity in the target work area, for example as illustrated in FIG. 4. In FIG. 4, the relation curve between the depth and the critical porosity may also be represented as:

$$\phi_c = -0.069^{-1} \ln\left(\frac{H}{6504.8}\right) \quad (3)$$

wherein $\phi_c$ denotes a critical porosity, and H denotes a depth.

In one embodiment of the present application, the designated seismic attribute is selected from a seismic data volume in the target work area, and the selected designated seismic attribute is sensitive to the reservoir physical property, i.e., the selected designated seismic attribute is strongly correlated to the reservoir physical property. In different target work areas, the designated seismic attribute sensitive to the reservoir physical property may also be different. For example, in one work area, the relative wave impedance is sensitive to the reservoir physical property, while in another work area, the amplitude may be sensitive to the reservoir physical property.

Figure 5:
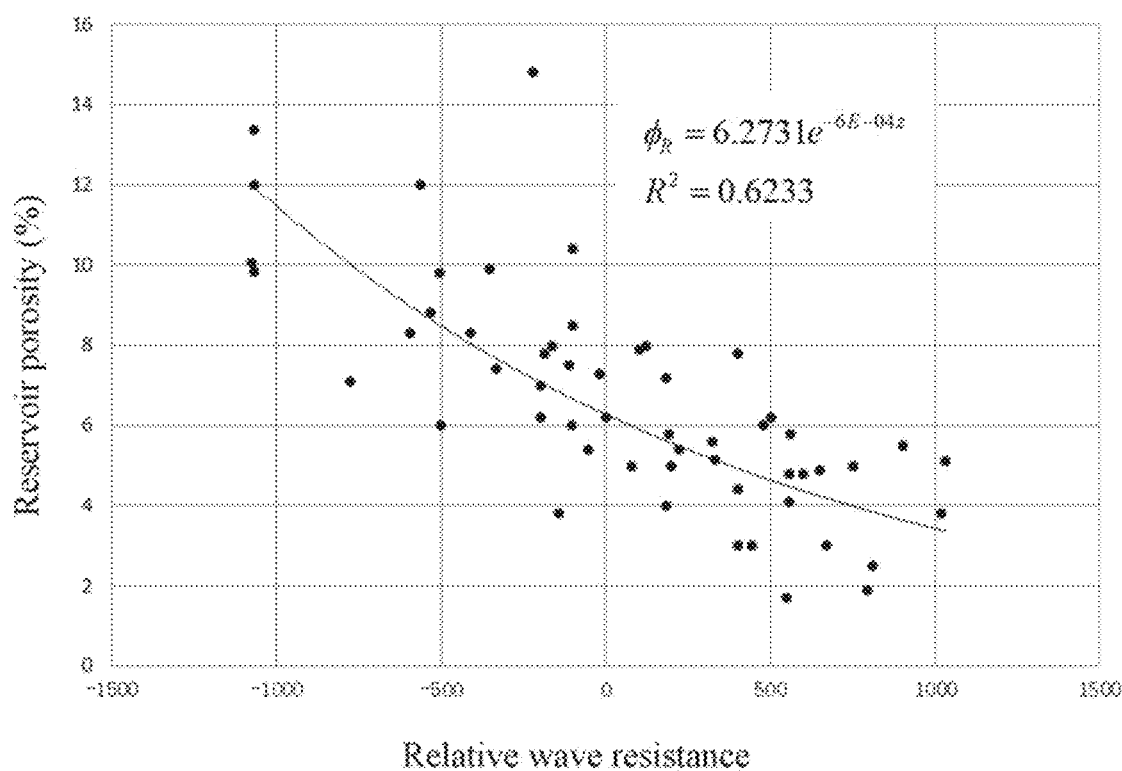
FIG. 5 illustrates a cross-plot between a conglomerate porosity and a relative wave impedance according to one embodiment of the present application.

For example, in one embodiment of the present application, the reservoir porosity and the relative wave impedance are well correlated to each other. Thus, the relative wave impedance may be taken as the designated seismic attribute. Determining a second relation curve between a reservoir physical property of the known diagenetic trap and a designated seismic attribute may comprise the following steps. First, the reservoir porosity of the known diagenetic trap and corresponding relative wave impedance may be acquired by means of counting; next, the reservoir porosity may be fitted with the corresponding relative wave impedance, and the fitting may be achieved in any appropriate fitting method such as least square fitting, so as to obtain the relation curve between the reservoir porosity in the target work area and the corresponding relative wave impedance, for example as illustrated in FIG. 5. In FIG. 5, the relation curve between the depth and the reservoir porosity may also be represented as:

$$\phi_R = 6.2731 e^{-E-04z} \quad (4)$$

wherein, $\phi_R$ denotes a reservoir porosity, and z denotes a relative wave impedance. Referring again to FIG. 1, S102 corresponds to determining a third relation curve between the depth and the critical physical property in the target work area and the designated seismic attribute according to the first relation curve and the second relation curve. In one embodiment, the first relation curve is a relation curve between the depth and the critical physical property, and the second relation curve is a relation curve between the reservoir physical property and the designated seismic attribute, thus when the critical physical property is equal to the reservoir physical property, the relation curve between the depth and the critical physical property in the target work area and the designated seismic attribute can be established. In an example where the physical property is the porosity, and the designated seismic attribute is the relative wave impedance, when formula (4) is equal to formula (3), a relation curve $\phi_c = f(H,z)$ between the critical porosity, the depth and the relative wave impedance can be obtained.

S103 corresponds to performing a diagenetic trap identification of the target work area according to the third relation curve. Under general conditions, a reservoir cannot be charged with oil and gas unless the reservoir porosity is larger than the critical porosity. Thus, in one embodiment, performing a diagenetic trap identification of the target work area according to the third relation curve may comprise the following steps. First, in each depth plane of the target work area, a distribution of position points where a first porosity is larger than a second porosity is determined according to the third relation curve, so as to determine a distribution of diagenetic traps in the depth plane; the first porosity is a reservoir porosity corresponding to the relative wave impedance under the depth, and the second porosity is a critical porosity under the depth. The target work area may be deemed as a three-dimensional structure, and in the range of the target work area, the position points of the same depth constitute a horizontal plane which may be referred to as a depth plane. Thus, the stratums of different depths correspond to different depth planes, and the whole target work area may be equivalent to a three-dimensional structure composed of depth planes orderly stacked.

Next, a diagenetic trap identification result of the target work area is obtained according to the distribution of the diagenetic traps in all of the depth planes of the target work area.

In one embodiment of the present application, in order to facilitate image display, the diagenetic trap distribution portion in each depth plane may be highlighted, thus after the distributions of the diagenetic traps in all of the depth planes of the target work area are obtained, the spatial distribution of all of the diagenetic traps in the target work area can be acquired.

In one embodiment of the present application, according to the distribution of the diagenetic traps in each depth plane, a sum of trap numbers in the depth plane can be obtained, while a total trap number of all of the diagenetic traps in the target work area can be obtained by accumulating the sums of trap numbers in all of the depth planes of the target work area.

Figure 6:
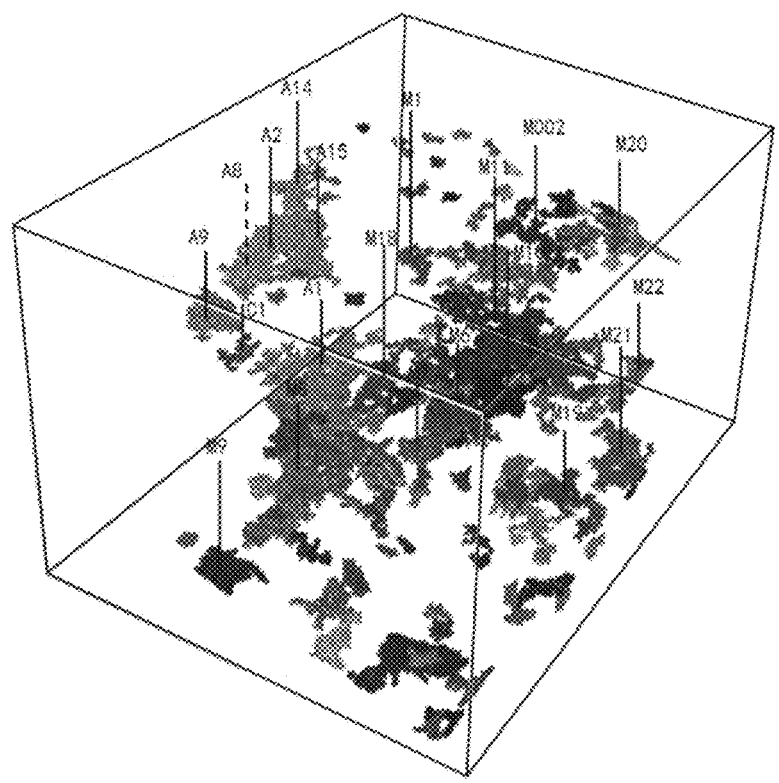
FIG. 6 illustrates a stereo diagram of a conglomerate diagenetic trap according to one embodiment of the present application.

Generally, one target work area may contain a plurality of diagenetic traps which are independent from or connected with each other. For example, as illustrated in FIG. 6, the trap number of various diagenetic traps in the target work area and the connectivity between the diagenetic traps can be further determined from the distribution of the diagenetic traps in all of the depth planes of the target work area, thereby laying a basis for subsequently evaluating the reserve or the exploitable reserve of each diagenetic trap in the target work area.

In one embodiment of the present application, a method is applied to the Junggar basin Triassic Baikouquan formation. It is firstly found out that the critical physical property of the conglomerate diagenetic trap oil-gas charged reservoir varies with the burial depth, and quantitatively represents the differences between the diagenetic trap forming conditions of different depths and different regions. By using a method in accordance with an embodiment of the present application described herein, 141 diagenetic traps and an area of 2011 km$^2$ are finely identified, and 20 preliminary prospecting wells and evaluation wells are deployed (as illustrated in FIG. 6). In FIG. 6, the characters starting with A or M are identifiers of corresponding wells. It can be seen that a total of 20 wells are deployed, wherein the drilling conditions of 19 wells (indicated with solid lines) coincide with the identification results, and only the drilling condition of one well (indicated with a dotted line) does not coincide with the identification result, i.e., the coincident rate reaches 95%, and finally an industrial oil flow of reserves of hundred-million-ton scale can be obtained.

Figure 7:
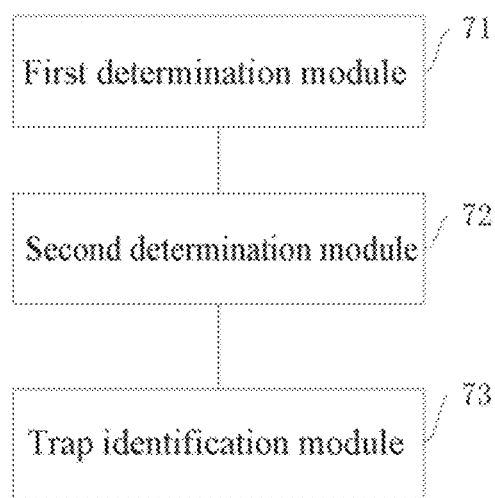
FIG. 7 illustrates a structure block diagram of an apparatus for identifying a low permeable conglomerate diagenetic trap according to one embodiment of the present application.

FIG. 7 illustrates an apparatus for identifying a low permeable conglomerate diagenetic trap according to one embodiment of the present application. As shown, the apparatus comprises a first determination module 71, configured to determine a first relation curve between a depth and a critical physical property of a known diagenetic trap in a target work area, and a second relation curve between a reservoir physical property of the known diagenetic trap and a designated seismic attribute. The apparatus also includes a second determination module 72, configured to determine a third relation curve between the depth and the critical physical property in the target work area and the designated seismic attribute according to the first relation curve and the second relation curve. The apparatus also includes a trap identification module 73, configured to perform a diagenetic trap identification of the target work area according to the third relation curve.

A technical improvement can be distinguished as a hardware improvement (e.g., an improvement to a circuit structure such as a diode, a transistor, a switch, etc.) or a software improvement (a methodological flow improvement). However, with the development of technology, many methodological flow improvements have been deemed as direct improvements to hardware circuit structure. Designers can program improved methodological flow into a hardware circuit to obtain corresponding hardware circuit structure. Thus, a methodological flow improvement may also be implemented by a hardware entity module. For example, a Programmable Logic Device (PLD) (e.g., a Field Programmable Gate Array (FPGA)) is such an integrated circuit with its logical functions determined from a device programmed by the user. The designer can integrate a digital system onto a PLD through programming by himself, without requiring the chip manufacturer to design and fabricate the Application Specific Integrated Circuit (ASIC) chip.

In addition, currently instead of manually fabricating the integrated circuit chip, the programming may be realized using a software "logic compiler", which is similar to the software compiler used for program development and writing. The original code before compiling may be written in a particular programming language which is referred to as Hardware Description Language (HDL), including many types such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and currently Very-High-Speed Integrated Circuit Hardware Description Language (VHDL) and Verilog are widely used. Those skilled in the art will appreciate that a hardware circuit for realizing logical methodical flow can be easily obtained by simple logic programming of the methodical flow into an integrated circuit using the above hardware description languages.

A controller as may be referred to herein with respect to certain embodiments may be implemented in various ways. For example, the controller may take the form of a microprocessor or a processor, and a computer readable medium that stores computer readable program codes (e.g., software or firmware) which can be executed by the (micro)processor, a logic gate, a switch, an Application Specific Integrated Circuit (ASIC), a programmable logic controller and an embedded microcontroller. Examples of the controller include but are not limited to the following microcontrollers: ARC 625D, Atmel AT91SAM, Microchip PIC18F26K20 and Silicone Labs C8051F320, and the controller of a memory can be further implemented as a part of the control logic of the memory. By logically programming the methodical steps, the controller is enabled to realize the same function in the form of a logic gate, a switch, an ASIC, a programmable logic controller, an embedded microcontroller, etc. Thus, such a controller may be deemed as a hardware component, while means included therein for realizing various functions may also be deemed as structures in the hardware component. Alternatively, those means for realizing various functions may even be deemed as not only software modules, but also structures in the hardware component.

In order to facilitate the descriptions of the various embodiments herein, an apparatus may be described with various functional units, respectively. During implementation, the functions of the units may be realized in the same or a plurality of software and/or hardware.

Certain embodiments of the present application are described with reference to flow diagram(s) and/or a block diagram(s) of method, apparatus (system) and/or computer program product according. It will be appreciated that each flow and/or block in such flow diagram and/or block diagram and a combination of flows and/or blocks in the flow diagram and/or the block diagram can be realized by computer program instructions. Those computer program instructions can be provided to a general computer, a dedicated computer, an embedded processor or a processor of other programmable data processing device to produce a machine, so that the instructions executed by the processor of the computer or other programmable data processing device produce means for realizing specified functions in one or more flows in the flow diagram and/or one or more blocks in the block diagram.

These computer program instructions may also be stored in a computer readable memory capable of guiding the computer or other programmable data processing devices to work in a particular manner, so that the instructions stored in the computer readable memory can produce manufacture articles including an instructing device which realizes function(s) specified in one or more flows in the flow diagram and/or one or more blocks in the block diagram.

These computer program instructions may also be loaded onto the computer or other programmable data processing devices, so that a series of operation steps are performed on the computer or other programmable data processing devices to produce a processing realized by the computer, thus the instructions executed on the computer or other programmable devices provide step(s) for realizing function(s) specified in one or more flows in the flow diagram and/or one or more blocks in the block diagram. A typical computing device may comprise one or more processors (CPUs), an input/output interface, a network interface and a memory. The memory may have the form of a volatile memory, a Random-Access Memory (RAM) and/or a nonvolatile memory such as Read-Only Memory (ROM) or a flash RAM, etc. among the computer readable medium. The memory is an example of the computer readable medium. The computer-readable medium can include permanent and non-permanent, removable and non-removable media, which can realize the information storage in any method or technique. The information can be computer readable instructions, data structures, program modules or other data. An example of the computer storage medium includes, but not limited to, a phase change memory (PRAM), a static random access memory (SRAM), a dynamic random access memory (DRAM), other types of random access memory (RAM), a read-only memory (ROM), an electrically-erasable programmable read-only memory (EEPROM), a flash memory or other memory techniques, a compact disk read only memory (CD-ROM), a digital versatile disc (DVD) or other optical storages, magnetic cassette tapes, magnetic diskettes or other magnetic storage device or any other non-transmission medium, which can be used for the storage of information accessible to a computing device. According to the definitions herein, the computer readable medium does not include any temporary computer readable media (transitory media), such as modulated data signal and carrier wave.

Further to be noted, the term "comprise", "include" or any other variant intends to cover the non-exclusive inclusions, so that a process, a method, a commodity or a device comprising a series of elements comprise not only those elements, but also other elements not explicitly listed, or further comprise inherent elements of such process, method, commodity or device. In a case where there is no further limitation, the elements defined by a sentence "comprising a . . . " do not exclude other identical elements existing in the process, method, commodity or device comprising the elements.

It will be understood by a person skilled in the art that the embodiments of the present application can be provided as a method, an apparatus (system), and/or or a computer program product. Therefore, the present application can adopt the forms of embodiments in terms of hardware alone, or software alone, or a combination of software and hardware. Moreover, the present application can adopt the forms of the computer program product implemented on one or more computer-usable storage mediums (including but not limited to magnetic disk storage, CD-ROM, optical memory etc.) including computer usable program codes.

The present application may be described in the general context of computer executable instructions executed by the computer, e.g., the program module. In general, the program module includes routine, program, object, component, data structure, etc. executing a particular task or realizing a particular abstract data type. The present application may also be put into practice in the distributed computing environments where tasks are executed by remote processing devices connected through a communication network. In the distributed computing environments, the program modules may be located in the local and remote computer storage medium including the storage device.

Across embodiments described herein, the same or similar portions of the embodiments can refer to each other. Each embodiment may have an emphasis on certain aspects from other embodiments. For example, aspects of a system embodiment may be similar to a method embodiment. The above descriptions discuss some example embodiments and implementations of the present application, rather than limitations to the present application. Those skilled in the art will recognize that the present application is intended to cover amendments or variations therefrom, and that any amendment, equivalent substitution, improvement, etc. made under the spirit and principle of the present application shall fall within the scope of the claims of the present application.

The invention claimed is:

1. A method for identifying a low permeable conglomerate diagenetic trap, comprising:
    determining, by a processor, a first relation curve between a depth and a critical physical property of a known diagenetic trap in a target work area;
    determining, by the processor, a second relation curve between a reservoir physical property of the known diagenetic trap and a designated seismic attribute;
    determining, by the processor, a third relation curve between the depth and the critical physical property of the known diagenetic trap in the target work area and the designated seismic attribute according to the first relation curve and the second relation curve; and
    identifying, by the processor, one or more diagenetic traps within the target work area according to the third relation curve,
    wherein identifying, by the processor, the one or more diagenetic traps within the target work area according to the third relation curve comprises:
    in each depth plane of the target work area, determining, by the processor, a distribution of position points where a first porosity is larger than a second porosity according to the third relation curve, so as to determine a distribution of the one or more diagenetic traps in the depth plane, wherein the first porosity is a reservoir porosity corresponding to the relative wave impedance under a depth corresponding to the depth plane and the second porosity is a critical porosity under the depth; and
    determining, by the processor, a trap number of the one or more diagenetic traps within the target work area and a connectivity between the one or more diagenetic traps, based on the distribution of the one or more diagenetic traps in all of the depth planes of the target work area.

2. The method for identifying a low permeable conglomerate diagenetic trap according to claim 1, wherein determining, by the processor, the first relation curve between the depth and the critical physical property of the known diagenetic trap in the target work area comprises:
    acquiring a depth, a surrounding rock pore throat radius, a reservoir pore throat radius, and
    a reservoir porosity corresponding to the reservoir pore throat radius of the known diagenetic trap;
    determining, by the processor, a relation curve between the depth and a critical reservoir pore throat radius in the target work area according to the depth and a ratio of the reservoir pore throat radius to the surrounding rock pore throat radius; and
    determining, by the processor, a relation curve between the depth and a critical porosity in the target work area according to the reservoir porosity and the relation curve between the depth and the critical reservoir pore throat radius.

3. The method for identifying a low permeable conglomerate diagenetic trap according to claim 1, wherein the designated seismic attribute is a relative wave impedance, and wherein determining, by the processor, the second relation curve between the reservoir physical property of the known diagenetic trap and the designated seismic attribute comprises:
    acquiring a reservoir porosity of the known diagenetic trap and corresponding relative wave impedance; and
    fitting the reservoir porosity with the corresponding relative wave impedance to obtain a relation curve between the reservoir porosity and the corresponding relative wave impedance in the target work area.

4. The method for identifying a low permeable conglomerate diagenetic trap according to claim 1, wherein the third relation curve comprises a relation curve between the critical porosity, the depth, and a relative wave impedance in the target work area.

5. The method for identifying a low permeable conglomerate diagenetic trap according to claim 2, wherein determining, by the processor, the relation curve between the depth and the critical reservoir pore throat radius in the target work area according to the depth and the ratio of the reservoir pore throat radius to the surrounding rock pore throat radius comprises:

cross-plotting the depth with the ratio of the reservoir pore throat radius to the surrounding rock pore throat radius, and determining the relation curve between the depth and the critical reservoir pore throat radius in the target work area.

6. The method for identifying a low permeable conglomerate diagenetic trap according to claim 2, wherein determining, by the processor, the relation curve between the depth and the critical porosity in the target work area according to the reservoir porosity and the relation curve between the depth and the critical reservoir pore throat radius comprises:

determining, by the processor, the relation curve between the depth and the critical porosity in the target work area according to a positive correlation relation between the reservoir porosity and the reservoir pore throat radius and the relation curve between the depth and the critical reservoir pore throat radius.

7. An apparatus for identifying a low permeable conglomerate diagenetic trap, comprising:
a processor; and
a memory operatively coupled to the processor and storing instructions which when executed, cause the processor to perform specific operations,
wherein the specific operations comprise:
determining a first relation curve between a depth and a critical physical property of a known diagenetic trap in a target work area;
determining a second relation curve between a reservoir physical property of the known diagenetic trap and a designated seismic attribute;
determining a third relation curve between the depth and the critical physical property of the known diagenetic trap in the target work area and the designated seismic attribute according to the first relation curve and the second relation curve; and
identifying one or more diagenetic traps within the target work area according to the third relation curve,
wherein identifying the one or more diagenetic traps within the target work area according to the third relation curve comprises:
in each depth plane of the target work area, determining a distribution of position points where a first porosity is larger than a second porosity according to the third relation curve, so as to determine a distribution of the one or more diagenetic traps in the depth plane, wherein the first porosity is a reservoir porosity corresponding to the relative wave impedance under a depth corresponding to the depth plane and the second porosity is a critical porosity under the depth; and
determining a trap number of the one or more diagenetic traps within the target work area and a connectivity between the one or more diagenetic traps, based on the distribution of the one or more diagenetic traps in all of the depth planes of the target work area.

8. The apparatus for identifying a low permeable conglomerate diagenetic trap according to claim 7, wherein when determining the first relation curve between the depth and the critical physical property of the known diagenetic trap in a target work area, the processor further performs the following operations:

acquiring a depth, a surrounding rock pore throat radius, a reservoir pore throat radius and a reservoir porosity corresponding to the reservoir pore throat radius of the known diagenetic trap;
determining a relation curve between the depth and a critical reservoir pore throat radius in the target work area according to the depth and a ratio of the reservoir pore throat radius to the surrounding rock pore throat radius; and
determining a relation curve between the depth and the critical porosity in the target work area according to the reservoir porosity and the relation curve between the depth and the critical reservoir pore throat radius.

9. The apparatus for identifying a low permeable conglomerate diagenetic trap according to claim 7, wherein the designated seismic attribute is a relative wave impedance, and wherein in determining a second relation curve between the reservoir physical property of the known diagenetic trap and the designated seismic attribute, the processor further performs the following operations:

acquiring a reservoir porosity of the known diagenetic trap and corresponding relative wave impedance; and
fitting the reservoir porosity with the corresponding relative wave impedance to obtain a relation curve between the reservoir porosity and the corresponding relative wave impedance in the target work area.

10. The apparatus for identifying a low permeable conglomerate diagenetic trap according to claim 7, wherein the third relation curve comprises a relation curve between a critical porosity, the depth and a relative wave impedance in the target work area.

11. The apparatus for identifying a low permeable conglomerate diagenetic trap according to claim 8, wherein when determining the relation curve between the depth and the critical reservoir pore throat radius in the target work area according to the depth and the ratio of the reservoir pore throat radius to the surrounding rock pore throat radius, the processor further performs the following operations:

cross-plotting the depth with the ratio of the reservoir pore throat radius to the surrounding rock pore throat radius, and determining the relation curve between the depth and the critical reservoir pore throat radius in the target work area.

12. The apparatus for identifying a low permeable conglomerate diagenetic trap according to claim 8, wherein when determining a relation curve between the depth and the critical porosity in the target work area according to the reservoir porosity and the relation curve between the depth and the critical reservoir pore throat radius, the processor further performs the following operations:

determining the relation curve between the depth and the critical porosity in the target work area according to a positive correlation relation between the reservoir porosity and the reservoir pore throat radius and the relation curve between the depth and the critical reservoir pore throat radius.

13. A non-transitory computer storage medium storing computer program instructions which, when executed by a processor, causes a computer to perform functions that include:

determining a first relation curve between a depth and a critical physical property of a known diagenetic trap in a target work area;
determining a second relation curve between a reservoir physical property of the known diagenetic trap and a designated seismic attribute;

determining a third relation curve between the depth and the critical physical property of the known diagenetic trap in the target work area and the designated seismic attribute according to the first relation curve and the second relation curve;

identifying one or more diagenetic traps within the target work area according to the third relation curve wherein identifying the one or more diagenetic traps within the target work area according to the third relation curve comprises:

in each depth plane of the target work area, determining a distribution of position points where a first porosity is larger than a second porosity according to the third relation curve, so as to determine a distribution of the one or more diagenetic traps in the depth plane, wherein the first porosity is a reservoir porosity corresponding to the relative wave impedance under a depth corresponding to the depth plane and the second porosity is a critical porosity under the depth; and determining a trap number of the one or more diagenetic traps within the target work area and a connectivity between the one or more diagenetic traps, based on the distribution of the one or more diagenetic traps in all of the depth planes of the target work area.

* * * * *